(12) United States Patent
Vuk

(10) Patent No.: US 7,383,684 B2
(45) Date of Patent: Jun. 10, 2008

(54) HYBRID ENGINE

(75) Inventor: Carl Thomas Vuk, Denver, IA (US)

(73) Assignee: Deere & Company, Moline, IL (US)

( * ) Notice: Subject to any disclaimer, the term of this patent is extended or adjusted under 35 U.S.C. 154(b) by 65 days.

(21) Appl. No.: 11/401,167

(22) Filed: Apr. 10, 2006

(65) Prior Publication Data

US 2007/0234721 A1 Oct. 11, 2007

(51) Int. Cl.
*F02B 33/44* (2006.01)

(52) U.S. Cl. .......................................... 60/606; 60/597

(58) Field of Classification Search .................. 60/606, 60/597, 772, 773; 290/4 D, 2, 52, 31, 46
See application file for complete search history.

(56) References Cited

U.S. PATENT DOCUMENTS

| | | | |
|---|---|---|---|
| 2,503,289 A * | 4/1950 | Nettel ........................ | 290/4 D |
| 3,676,999 A * | 7/1972 | Oldfield ........................ | 60/606 |
| 4,940,029 A | 7/1990 | Rees | |
| 5,201,181 A | 4/1993 | Ohmori et al. | |
| 5,328,355 A | 7/1994 | Kobayashi et al. | |
| 5,693,201 A * | 12/1997 | Hsu et al. .................... | 204/241 |
| 5,881,559 A * | 3/1999 | Kawamura .................... | 60/597 |
| 6,289,666 B1 | 9/2001 | Ginter | |
| 6,484,509 B2 | 11/2002 | Kraft et al. | |
| 6,554,088 B2 * | 4/2003 | Severinsky et al. ......... | 180/65.2 |
| 2004/0091764 A1* | 5/2004 | Hsu et al. ...................... | 429/34 |

FOREIGN PATENT DOCUMENTS

JP 04124428 A * 4/1992

* cited by examiner

*Primary Examiner*—Thomas E. Denion
*Assistant Examiner*—Mary A Davis

(57) ABSTRACT

An internal combustion engine includes an exhaust manifold; an intake manifold; and a turbocharger including a turbine in communication with the exhaust manifold, and a compressor in communication with the intake manifold. An electrical generator is coupled with the turbine. A motor receives electrical input power from the generator and provides mechanical output power. A combustor selectively provides additional input power to the motor.

9 Claims, 2 Drawing Sheets

HYBRID ENGINE

FIELD OF THE INVENTION

The present invention relates to internal combustion engines, and, more particularly, to engines with electric turbo compounding.

BACKGROUND OF THE INVENTION

Internal combustion (IC) engines may be of a multi-cylinder or gas turbine design. It is common for a multi-cylinder engine to include a turbocharger having a turbine which is rotatably driven by exhaust gases and a compressor providing compressed charge air to the combustion cylinders. The turbocharger uses otherwise spent exhaust gases to increase the power output from the engine.

It is known to use the exhaust gases which are discharged from the turbine of the turbocharger to rotatably drive a second turbine connected to an electrical generator. The electrical generator is selectively coupled through a controller to a motor providing additional mechanical input power to the flywheel of the multi-cylinder engine. The amount of energy remaining in the exhaust gas after passing through the turbocharger is somewhat diminished, therefore the amount of power that can be extracted with a second turbine is limited.

A gas turbine engine as mentioned above typically has a compressor stage, combustor and turbine stage. Air is pressurized in the compressor, mixed with fuel and ignited in the combustor, and then expanded in the turbine stage. A combustor is commonly used with a gas turbine engine, but is not used with multi-cylinder IC engines.

What is needed in the art is a multi-cylinder IC engine which may be operated using conventional techniques for most load conditions, but coupled to a compact auxiliary power source to provide high energy output to meet peak power demands.

SUMMARY OF THE INVENTION

The present invention provides a way to significantly increase the output capability of an internal combustion engine. The first stage of power increases come from application of turbo compounding technologies that exploit waste exhaust heat not recovered from the turbocharger. This technology requires a second stage turbine coupled to a high speed generator. The electrical output of the generator is then coupled back to the engine using an electrical motor. Such a device can increase specific engine output from 10 to 30% with good efficiency.

The present invention exploits the turbo compounding hardware for additional power growth. By adding a combustor independent of the engine, additional hot gasses can be provided that can be used to increase the output of the turbo compounding turbine. Substantial additional power output is possible with such an arrangement. The incremental efficiency may not be as high as the base engine, but the invention is useful where peak power is required only occasionally. This would allow a small engine to run at a higher duty cycle, improving system efficiency in the high usage area of the operating envelope.

Two arrangements of hardware are of particular interest. In one form, the invention includes a turbocharged internal combustion engine, a second stage electric turbo compounding device, and a motor/generator that recycles turbo compounding output back to the engine in mechanical form. A fraction of the turbocharger compressor output can be fed through a control valve to a combustor. The combustor delivers additional hot gasses to the turbo compounding turbine to provide supplemental power output. Several turbine architectures are possible. A second wheel can be attached to the generator rotor shaft, or the flow can be passed through a single wheel using a twin entry volute.

The invention comprises, in another form thereof, an internal combustion engine, a second stage electric turbo compounding device, and a motor/generator that recycles turbo compounding output back to the engine in mechanical form. This machine can be coupled to a micro turbine which includes a compressor and turbine mounted onto the rotor of a high speed motor/generator. A combustor is connected between the compressor and turbine. Combustor gasses blow through the turbine generating electrical power completely independent of the reciprocating engine. Electrical output is easily coupled to the reciprocating engine turbo compounding device using a DC link. The combined output uses the existing motor/generator to convert all the electrical power back to rotating shaft power for mechanically driving loads. Gaseous output from the micro turbine can be further expended through the turbo compounding turbine using a split entry volute for added system output and efficiency.

DETAILED DESCRIPTION OF THE INVENTION

Figure 1:
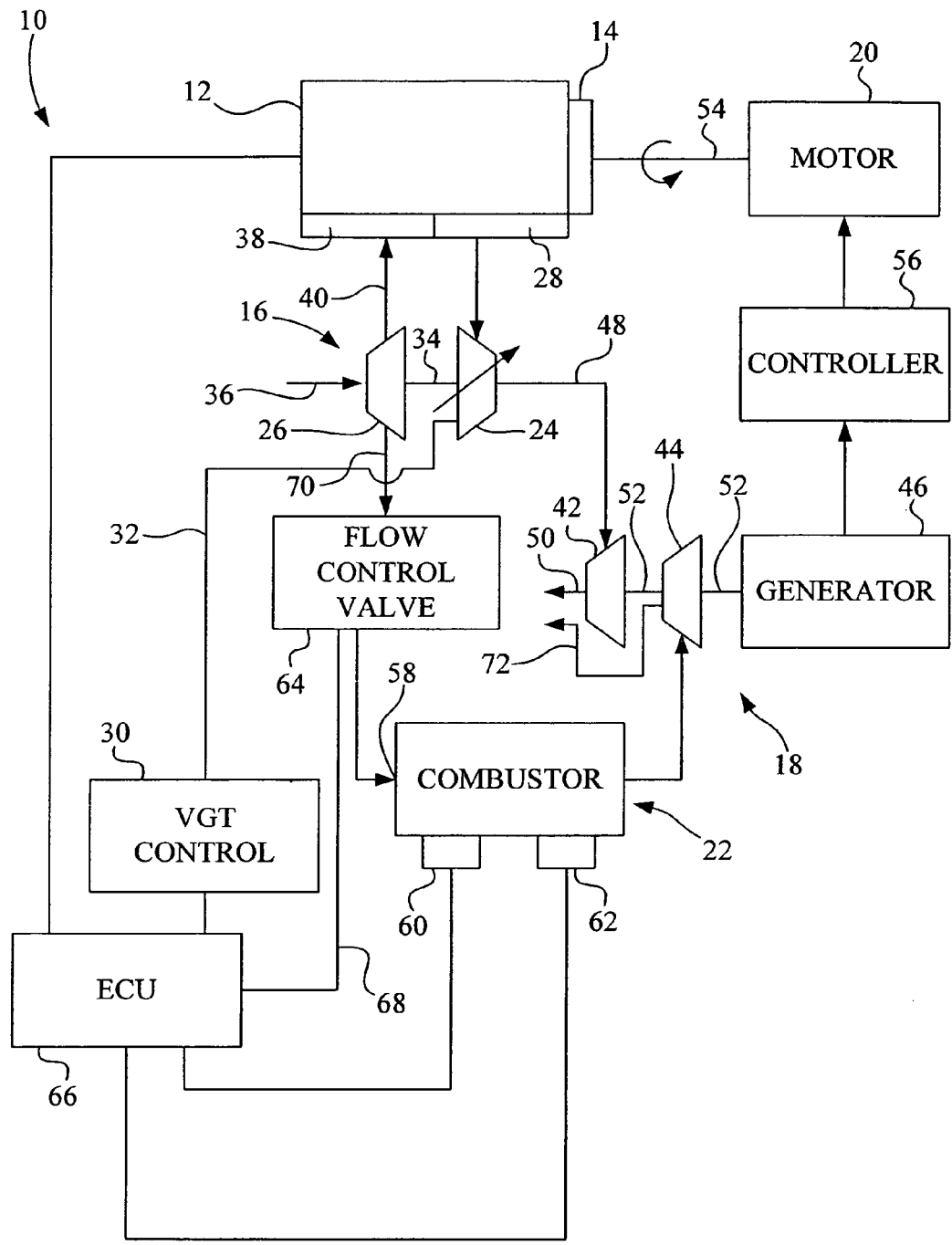
FIG. 1 is a schematic view of an embodiment of an internal combustion engine with hybrid electric power of the present invention.

Referring now to the drawings, and more particularly to FIG. 1, there is shown an embodiment of an IC engine 10 of the present invention. In general, IC engine 10 includes a block 12 carrying a flywheel 14, turbocharger 16, turbogenerator 18, motor 20 and combustor 22.

Cylinder block 12 defines a multi-cylinder internal combustion engine, with each cylinder carrying a respective piston which is coupled with a crankshaft (not shown) attached to flywheel 14. In the embodiment shown, cylinder block 12 forms part of a multi-cylinder diesel engine which may include any desired number of cylinders, typically an even number between two and twelve cylinders.

Turbocharger 16 includes a turbine 24 and a compressor 26. Turbine 24 is rotatably driven by exhaust gases discharged from exhaust manifold 28. In the embodiment shown, turbine 24 is configured as a variable geometry turbine (VGT), as indicated by the diagonal arrow through turbine 24, but may also be configured as a fixed geometry turbine if desirable. VGT 24 includes controllably actuated elements, such as vanes, blades, orifices or nozzles which are controllably adjusted using VGT control 30 via electrical line 32.

Turbine 24 rotatably drives shaft 34, which in turn rotatably drives compressor 26. Compressor 26 receives ambient air as indicated by arrow 36, and discharges compressed charge air to intake manifold 38 via fluid line 40.

Turbogenerator 18 includes a first turbine 42, second turbine 44 and electric generator 46. First turbine 42 is rotatably driven by exhaust gases discharged from turbocharger turbine 24 via fluid line 48. The exhaust gases are then discharged from first turbine 42 to the ambient environment, as indicated by arrow 50.

First turbine 42 and second turbine 44 are each coupled with a common shaft 52 providing input power to electric generator 46. First turbine 42 provides the primary input power to shaft 52 and electric generator 46. First turbine 42 is continuously driven using exhaust gases from turbocharger 16, and second turbine 44 is selectively and intermittently driven using exhaust gases from combustor 22, as will be described in more detail hereinafter.

Electrical power from generator 46 is used to drive motor 20, which in turn is mechanically coupled with flywheel 14 via shaft 54. Controller 56 selectively couples generator 46 with motor 20, particularly when additional power is needed, to provide additional input power to flywheel 14 via shaft 54.

Combustor 22 may itself be of conventional design, but is arranged within IC engine 10 in such a manner as to provide substantial increased power over conventional configurations. For example, it is possible to double the horsepower output from IC engine 10 when using combustor 22 in an arrangement as shown in FIG. 1 and described herein.

More particularly, combustor 22 includes a charge air inlet 58, igniter 60 and fuel injector 62. Combustor 22 may have a single stage design in which the compressed charge air and fuel are mixed within a single combustion chamber and ignited with igniter 60. As another example, combustor 22 can have a coaxial design in which fuel and air are injected into a center can, which is perforated and in fluid communication with a surrounding annular exhaust conduit. Other designs are also possible, as will be appreciated by those skilled in the art.

Charge air inlet 58 of combustor 22 is fluidly coupled with compressor 26 through flow control valve 64. Flow control valve 64 is controllably actuated using electronic control unit (ECU) 66 via electric line 68. Compressed charge air is continuously provided from compressor 26 to intake manifold 38 via fluid line 40, and a portion of the compressed charge air is intermittently provided to combustor 22 through flow control valve 64, as indicated by fluid line 70. The compressed charge air mixes with the fuel injected by fuel injector 62 and is ignited by igniter 60 to produce a heated, high pressure gas used to rotatably drive second turbine 44 of turbogenerator 18. This of course provides additional input power to electric generator 46, which is coupled back to flywheel 14 through motor 20. The spent exhaust gas is discharged from second turbine 44 to the ambient environment, as indicated by fluid line 72.

During operation at normal loads, IC engine 10 is operated without the use of combustor 22, such that all of the compressed charge air is discharged from compressor 26 to intake manifold 38 for introduction into the combustion cylinders within cylinder block 12. At high load requirements, ECU 66 actuates flow control valve 64 to discharge a portion of the compressed charge air to combustor 22. The compressed charge air is mixed with injected fuel and ignited within combustor 22. The exhaust gases are then discharged to second turbine 44 for additional input power to generator 46 and motor 20, as described above. As engine loads drop from peak values, the engine power may be reduced rather than turning off combustor 22, thereby providing additional input power to turbogenerator 18. As engine loads drop to sufficiently low power requirements, combustor 22 is turned off and diesel output power is increased to meet the current power demands.

Figure 2:
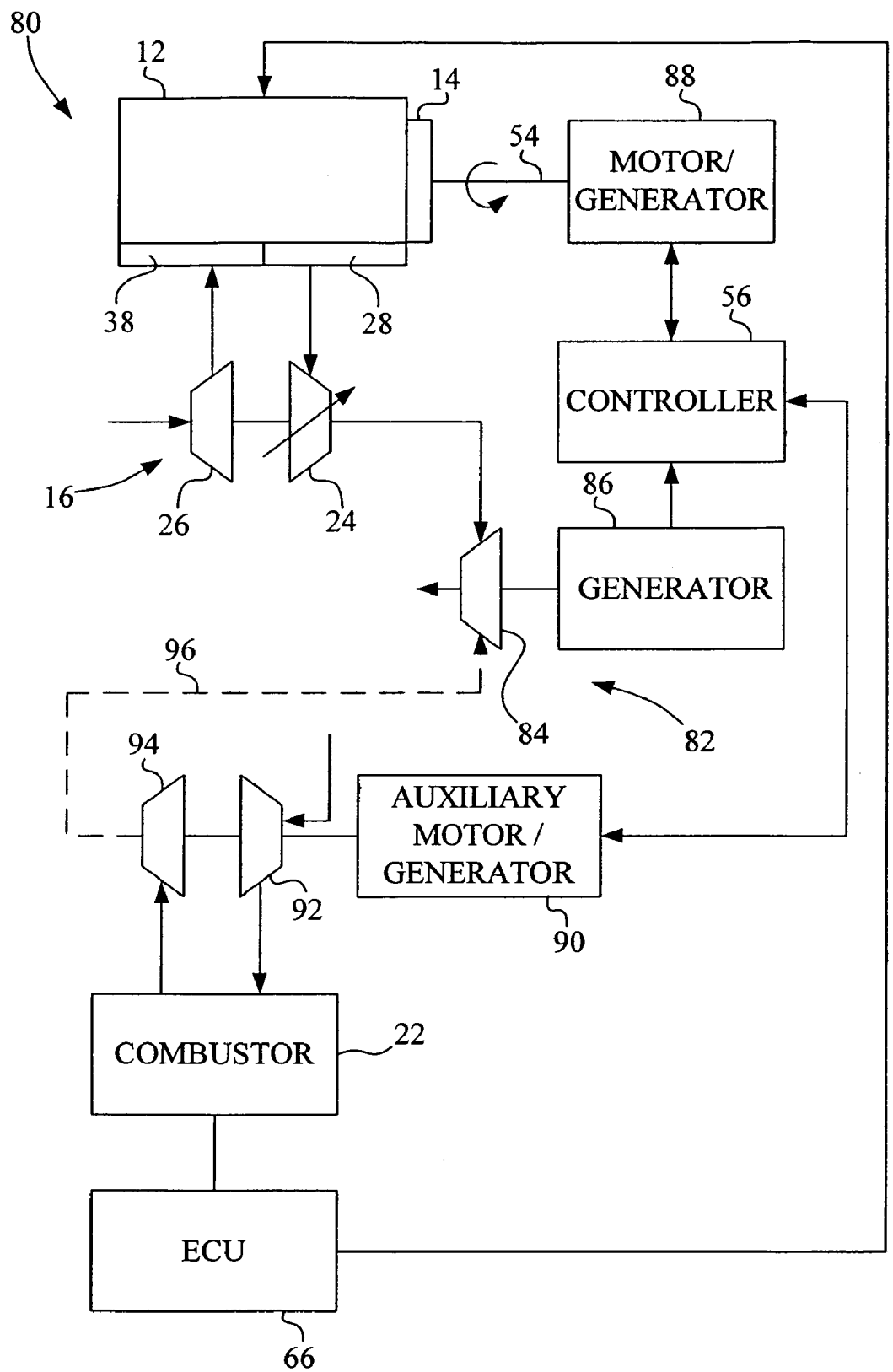
FIG. 2 is a schematic view of another embodiment of an internal combustion engine with hybrid electric power of the present invention.

Referring now to FIG. 2, there is shown another embodiment of an IC engine 80 of the present invention. Similar to the embodiment shown and described above with reference to FIG. 1, IC engine 80 includes a cylinder block 12 carrying a flywheel 14, exhaust manifold 28 and intake manifold 38, turbocharger 16 and combustor 22. A turbogenerator 82 includes a single turbine 84 providing mechanical input power to an electrical generator 86. Motor/generator 88 is selectively coupled with generator 86 via controller 56 to provide additional input power to flywheel 14 by rotating drive shaft 54.

Rather than providing additional input power to the turbogenerator as in the embodiment of FIG. 1, combustor 22 instead provides input power to an auxiliary motor/generator 90 which is selectively coupled with motor/generator 88 using controller 56. More particularly, combustor 22 receives compressed charge air from the ambient environment via compressor 92. The compressed charge air is mixed with fuel injected into combustor 22 and ignited under the control of ECU 66. The exhaust gases from combustor 22 rotatably drive turbine 94 providing input power to auxiliary motor/generator 90. The electrical output power from auxiliary motor/generator 90 is coupled with motor/generator 88, and in turn used as mechanical input power to flywheel 14. The power which is input to turbine 94 is greater than the power needed to drive compressor 92, and therefore there is a resultant net positive power input to auxiliary motor/generator 90.

Exhaust gas which is discharged from turbine 94 is likely discharged to the ambient environment, but may also be optionally used to provide additional input power to turbine 84 of turbogenerator 82, as indicated by dashed line 96.

During initial startup of combustor 22, it may be necessary to begin the combustion process within combustor 22 by providing external input power to auxiliary motor/generator 90 and compressor 92. This is accomplished by using motor/generator 88 as an electrical generator to which mechanical input power is provided from flywheel 14 and shaft 54. The electrical output power from motor/generator 88 is then coupled in a reverse direction through controller 56 to auxiliary motor/generator 90 to rotatably drive compressor 92 and turbine 94. After initial startup, auxiliary motor/generator 90 is again configured as an electrical generator selectively providing electrical input power to motor/generator 88 configured as a motor, which in turn provides additional input power to flywheel 14 via shaft 54.

Having described the preferred embodiment, it will become apparent that various modifications can be made without departing from the scope of the invention as defined in the accompanying claims.

The invention claimed is:

1. An internal combustion engine, comprising:
   an exhaust manifold;
   an intake manifold;
   a turbocharger including a turbocharger turbine in communication with said exhaust manifold, and a compressor in communication with said intake manifold;
   a turbo generator coupled with said turbocharger turbine said turbo generator including a generator first turbine driven by exhaust gas from said turbo charger turbine and an output shaft driving an electrical generator;
   a motor receiving electrical input power from said turbo generator and providing mechanical output power; and
   a combustor selectively providing additional input power to said motor;
   wherein said generator first turbine is also driven by exhaust gas from said combustor.

2. The internal combustion engine of claim 1, wherein said combustor selectively provides additional input power to said motor when selectively coupled with said compressor.

3. The internal combustion engine of claim 1, including an auxiliary generator having a generator second turbine coupled with and driven by said combustor, and a second compressor providing charge air to said combustor, said auxiliary generator selectively providing additional electrical input power to said motor.

4. The internal combustion engine of claim 3, wherein said motor comprises a motor/generator, and said auxiliary generator comprises an auxiliary motor/generator.

5. The internal combustion engine of claim 4, wherein at start-up of said combustor, said motor/generator is configured as a generator and said auxiliary motor/generator is configured as a motor.

6. An internal combustion engine, comprising:
a flywheel;
a motor receiving electrical input power and providing mechanical output power to said flywheel;
at least one electrical generator coupled with said motor and including a generator turbine; and
a combustor coupled with and driving said generator turbine and wherein said engine includes an exhaust manifold; an intake manifold; a turbocharger including a turbocharger turbine in communication with said exhaust manifold, and a compressor in communication with said intake manifold; and said turbocharger turbine is in communication with a corresponding said generator turbine.

7. The internal combustion engine of claim 6, further including a controller selectively driving said motor with electrical power from said electrical generator.

8. An internal combustion engine, comprising:
an exhaust manifold;
an intake manifold;
a turbocharger including a turbocharger turbine in communication with said exhaust manifold, and a compressor in communication with said intake manifold;
an electrical generator including a generator turbine, said generator turbine being coupled with said turbocharger turbine;
a motor receiving electrical input power from said generator and providing mechanical output power;
a combustor selectively providing additional input power to said motor; and
wherein said generator turbine comprises of only one said generator turbine connected to said electrical generator turbine also coupled with said combustor.

9. The internal combustion engine of claim 8, wherein said generator turbine is indirectly coupled with said combustor through an auxiliary motor/generator turbine.

* * * * *